UNITED STATES PATENT OFFICE.

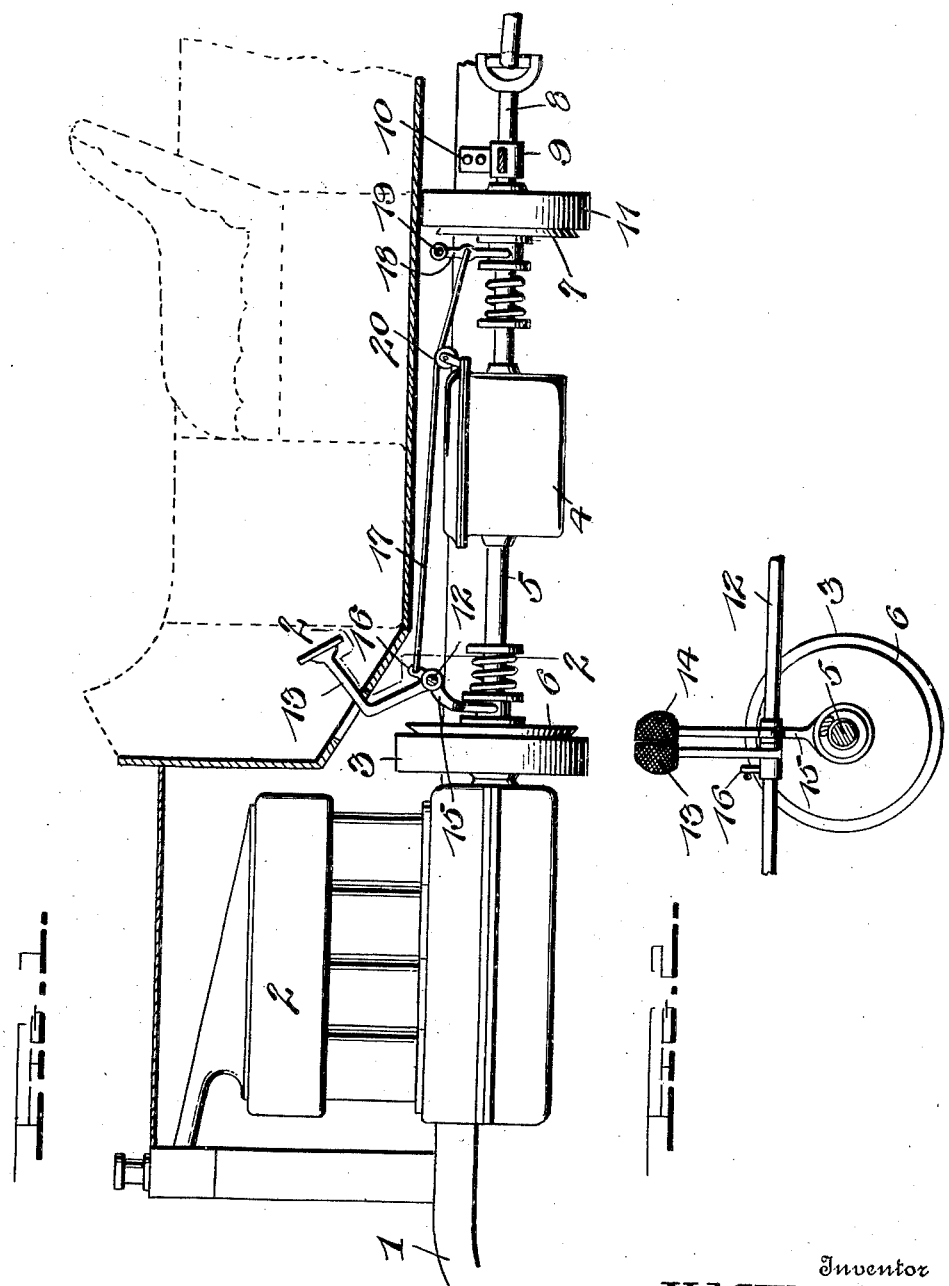

HARRY M. THORESON, OF YANKTON COUNTY, NEAR IRENE, SOUTH DAKOTA.

MECHANISM TO PREVENT THE STRIPPING OF TRANSMISSION-GEARS.

1,081,067.   Specification of Letters Patent.   Patented Dec. 9, 1913.

Application filed August 10, 1912. Serial No. 714,457.

*To all whom it may concern:*

Be it known that I, HARRY M. THORESON, a citizen of the United States, residing in the county of Yankton, near Irene, in the county of Clay and State of South Dakota, have invented certain new and useful Improvements in Mechanism to Prevent the Stripping of Transmission-Gears, of which the following is a specification, reference being had to the accompanying drawings.

This invention relates to improvements in mechanism to prevent the stripping of transmission gears of automobiles and the primary object of the present invention is to provide means whereby the transmission shaft may be stopped from rotating at intervals so that the transmission gears may be changed to prevent the stripping thereof and which will also eliminate the cutting and grinding sound from the transmission gears, as is true with the same which are now in use.

A further object of the present invention is to connect the transmission shaft with the main driving shaft and the crank shaft of an engine with frictional clutches which may be operated jointly or severally, so that the transmission gears may be changed to prevent the stripping thereof.

With these and other objects in view, this invention consists of the novel details of construction, combination, formation and arrangement of parts as will be hereinafter more fully described and particularly pointed out in the accompanying drawings.

In the accompanying drawings has been illustrated a simple and preferred form of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In the said drawings, Figure 1 is a detail section through the frame of an automobile illustrating my improvement as applied thereto, and Fig. 2 is a detail section taken on the line 2—2 of Fig. 1.

Reference now being had to the accompanying drawings wherein I have designated corresponding parts by like numerals throughout the several views, the numeral 1 indicates a portion of an ordinary automobile frame having mounted therein the usual gasolene engine 2, which has keyed to the crank shaft thereof a fly wheel 3. A casing 4 is mounted upon the framework of the automobile in the usual manner, and has mounted therein the usual sliding transmission gearing which is adapted to be operatively connected with the transmission shaft 5 in the usual manner. The forward end of this transmission shaft 5 has mounted thereon one member of an ordinary cone clutch 6, and its opposite end has slidably mounted thereon a similar spring actuated member 7 of a cone clutch.

The main driving shaft, indicated by the numeral 8, is journaled within a bearing 9 depending by means of a bracket 10 upon the framework of the automobile. This shaft has keyed thereto a fly wheel 11 which is adapted to contact with the clutch member 7 of the transmission shaft.

A shaft 12 is journaled within the framework of the automobile and has loosely mounted thereon a pair of parallel extending foot levers 13 and 14, respectively. The foot lever 14 has depending therefrom a curved arm 15, which is forked at its lower extremity and connected to the sleeve of the clutch member 6 in the usual manner whereby the clutch member on the transmission shaft may be thrown in and out of gear with the crank shaft of the engine. The opposite foot lever 13 has extending from the journaled sleeve thereof a lug 16 which is connected by a cable, chain or any other flexible member 17 to a lever 18. This lever 18 is pivotally mounted to the framework of the automobile at one end, as at 19, whereas its opposite end is forked and connected to the sleeve of the clutch member 7, whereby operating said lever said clutch member will be thrown in and out of gear with the fly wheel 11 of the main driving shaft. This cable 17 is connected adjacent the medial portion of the lever 18 and extends over an idle pulley 20 supported upon the upper face of the transmission gear casing and its opposite end is connected to the lug extension 16.

It is obvious from the foregoing description, taken in connection with the accompanying drawing, that the foot pedals 13 and 14 may be operated together, thereby throwing the clutch members 6 and 7 out of gear, which will obviously stop the rotation of the transmission shaft 5. When this transmission shaft 5 has been stopped, the transmission gear may be easily and readily changed at the will of the operator, thereby preventing the stripping of the gears and adding to their durability, but it is apparent that the lever 14 may be operated independently of the lever 13, thereby throwing the clutch 6 into gear and imparting to the transmission shaft 5 the required amount of momentum in changing the gears.

Having thus described the invention, what is claimed is:—

1. In a device of the character described, a transmission shaft, means for detachably connecting said transmission shaft with the crank shaft of an engine, means for detachably connecting said transmission shaft to the drive shaft of a vehicle, a pair of levers, means for connecting said levers with said detachable means, and foot pedals mounted on said levers, said pedals being arranged closely adjacent each other, whereby the pedals may be operated singly or both pedals may be operated by one foot of the operator, as and for the purpose described.

2. The combination with a vehicle frame, of a transmission shaft journaled thereupon, a clutch connecting one end of said transmission shaft with the crank shaft of an engine, a clutch connecting the opposite end of said transmission shaft with the drive shaft of a vehicle, a shaft journaled within the frame of a vehicle, a pair of parallel extending foot levers mounted upon the last mentioned shaft, a link extending from one lever for operating the first mentioned clutch, a flexible member extending from the other lever for operating the last mentioned clutch, and means whereby said levers may be operated independently or simultaneously, as and for the purpose described.

3. The combination with an automobile frame, of a transmission shaft journaled thereupon, a clutch connecting one end of said transmission shaft with the crank shaft of an engine, a clutch connecting the opposite end of the transmission shaft with a drive shaft, a shaft journaled within the frame of the automobile, a pair of foot levers mounted upon said second shaft, a link extending from one lever for operating the first mentioned clutch, and a flexible member extending from the other lever for operating the last mentioned clutch, foot pedals arranged on said levers, said pedals being arranged closely adjacent each other, whereby the pedals may be operated singly or both pedals may be operated by one foot of the operator.

In testimony whereof I hereunto affix my signature in the presence of two witnesses.

HARRY M. THORESON.

Witnesses:
H. S. MATTHEWS,
JAMES I. WELO.